United States Patent [19]

Kataoka et al.

[11] Patent Number: 4,836,323
[45] Date of Patent: Jun. 6, 1989

[54] VEHICULAR VOLTAGE REGULATING SYSTEM

[75] Inventors: Sachiro Kataoka, Ebina; Yoichi Iizima; Masaji Kuwahara, both of Tokyo; Seiei Takeoka; Kazuzi Katsutani, both of Yokohama, all of Japan

[73] Assignees: Nissan Motor Co., Ltd., Yokohama; Niles Parts Co., Ltd., Tokyo, both of Japan

[21] Appl. No.: 100,375

[22] Filed: Sep. 24, 1987

[30] Foreign Application Priority Data

Sep. 26, 1986 [JP] Japan .................... 61-227823

[51] Int. Cl.$^4$ ............................... B60R 21/00
[52] U.S. Cl. ...................... 180/270; 280/802
[58] Field of Search ............ 180/268, 270; 280/802, 280/801, 804, 806

[56] References Cited

U.S. PATENT DOCUMENTS

| | | | |
|---|---|---|---|
| 3,902,074 | 12/1973 | Vota | 180/270 |
| 3,904,884 | 9/1975 | Vota | 180/270 |
| 4,107,645 | 8/1978 | Lewis et al. | 180/270 |
| 4,175,633 | 11/1979 | Andres | 180/270 |

FOREIGN PATENT DOCUMENTS 58-33138 7/1983 Japan .

Primary Examiner—Richard A. Bertsch
Attorney, Agent, or Firm—Foley & Lardner, Schwartz, Jeffery, Schwaab, Mack, Blumenthal & Evans

[57] ABSTRACT

A vehicular voltage regulating system is mounted on an automotive vehicle equipped with an on-board electronic control device which is required to operate even when an ignition switch is turned OFF. The electronic control device is adapted to control operation of a passive seat belt arrangement. The voltage regulating system is comprised of detecting means for detecting starting operation for the electronic control device and outputting a first signal. Voltage regulation commanding means is provided to command voltage regulation by outputting a second signal for a predetermined time from a time at which the detecting means outputs the first signal. Additionally, regulating means for regulating a first voltage supplied directly from an on-board battery of the vehicle into a second voltage at a predetermined level and supplying the second voltage to the electronic control device in response to the second signal from the voltage regulation commanding means, thereby making unnecessary so-called stand-by current to the electronic control circuit thus to prevent overdischarging of the battery.

8 Claims, 4 Drawing Sheets

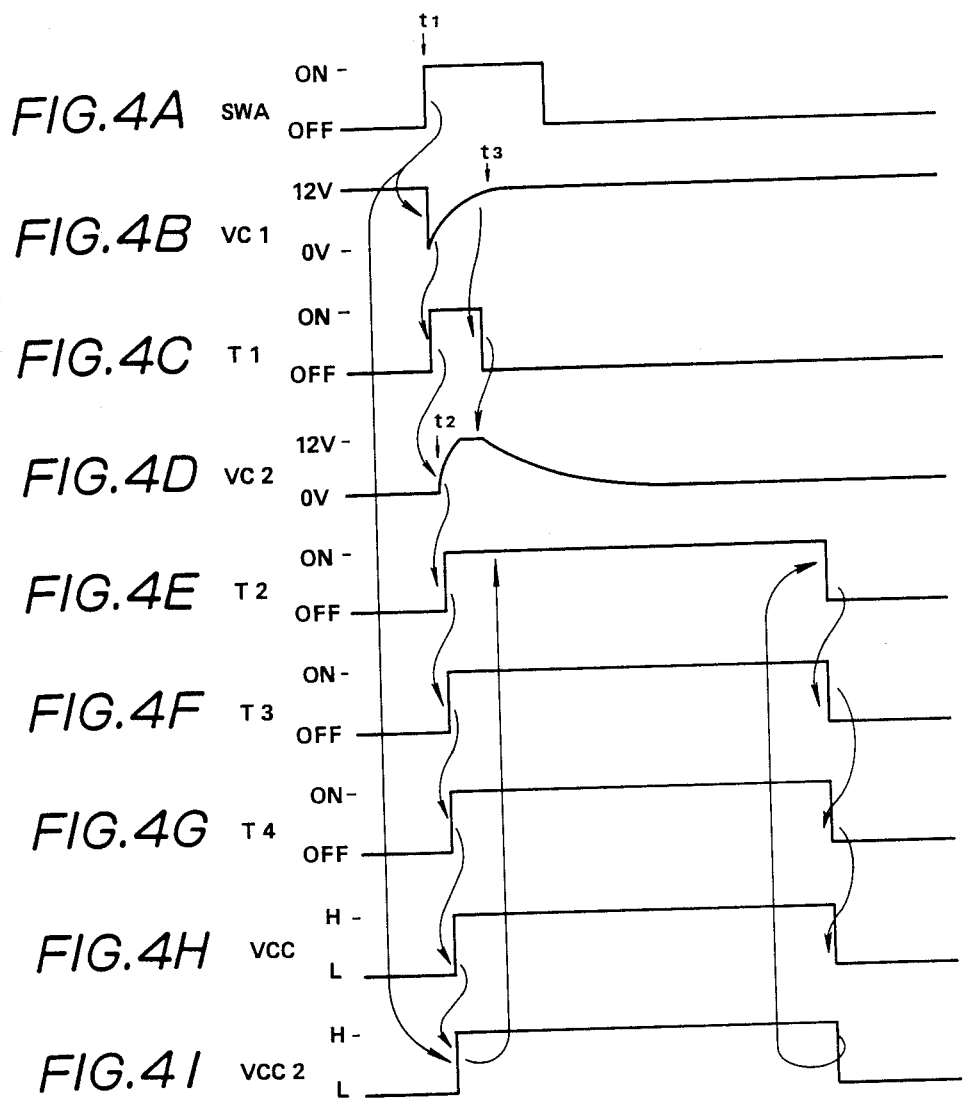

VEHICULAR VOLTAGE REGULATING SYSTEM

BACKGROUND OF THE INVENTION

1. Field of the Invention

The present invention relates to a vehicular voltage regulating system arranged to regulate a voltage (directly input from a battery and not through an ignition switch) to a voltage at a predetermined level and to supply the regulated voltage to an on-board electronic control device which is required to operate even when an ignition switch is turned OFF.

2. Description of the Prior Art automotive vehicles are recently equipped

Most automotive vehicles recently have been recently equipped with a seat belt system for restraining vehicle passenger seated on a seat. The seat belt system is required to operate so as to restrain the passenger or release the passenger from restraint, even when an ignition switch is turned OFF to stop an engine. Operation of the seat belt system is usually controlled by an on-board electronic control device which is supplied with voltage regulated by a voltage regulating device. The voltage regulating device is arranged to regulate the voltage (directly input from a battery and not through the ignition switch) into a voltage at a predetermined level even when the ignition switch is turned OFF to operate the seat belt system.

Thus, the conventional voltage regulating device is always supplied with the regulated voltage regardless of the ON and OFF states of the ignition switch thereby to maintain the stand-by condition, and therefore a small amount of so-called stand-by current unavoidably flows out from the voltage regulating device to the electronic control device. Such continuous flowing-out of the stand-by current provides possibility of causing overdischarging of the battery.

SUMMARY OF THE INVENTION

A vehicular voltage regulating system of the present invention is mounted on a vehicle equipped with an on-board electronic control device which is required to operate even when an ignition switch is turned OFF. The vehicular regulating system is comprised of detecting means for detecting the starting operation for the on-board electronic control device and outputting a first signal. Voltage regulation commanding means is provided to output a second signal for a predetermined time from a time at which the detecting means outputs the first signal. Additionally, regulating means is provided to regulate a first voltage supplied directly from the battery into a second voltage at a predetermined level and supply the second voltage to the on-board electronic control device in response to the second signal from the voltage regulation commanding means.

Accordingly, the voltage regulation commanding means stops output of the second signal upon lapse of the predetermined time, and therefore the regulating means stops output of the second voltage to the on-board electronic control device. This interrupts the flow of the stand-by current to the on-board electronic control device.

Thus, according to the principle of the present invention, the voltage regulated at the predetermined level is supplied to the electronic control device only for a predetermined time from the timing of starting operation of the electronic control device, so that so-called stand-by current to the electronic control device is made zero thereby preventing overdischarging of the battery.

BRIEF DESCRIPTION OF THE DRAWINGS

FIGS. 4A to 4I are timing charts showing operation of the voltage regulating system of FIG. 3.

DETAILED DESCRIPTION OF THE INVENTION

Figure 1:
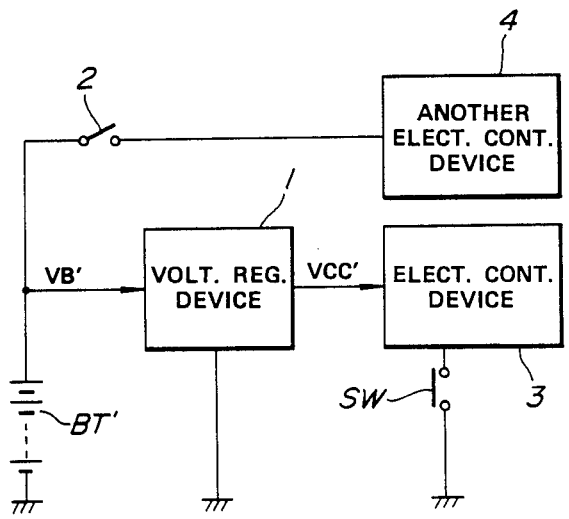
FIG. 1 is a block schematic diagram showing the principle of a conventional vehicular voltage regulating system.

To facilitate understanding of the present invention, a brief reference will be made to a conventional vehicular voltage regulating system, depicted in FIG. 1. Referring to FIG. 1, the conventional voltage regulating system includes voltage regulating device 1 which is adapted to regulate a voltage VB' (directly input from a on-board battery B without passing through an ignition switch 2) into a voltage VCC' at a predetermined level and supply the voltage VCC' to an on-board electronic control device 3 which is required to operate even when the ignition switch 2 is in OFF state, such as an electronic control circuit constituting part of a passive seat belt system. The passive seat belt system includes a seat belt for restrain the breast section of a passenger. The lower end section of the seat belt is engaged with a retractor secured to a floor of a vehicle, while the upper end section is movably engaged with a roof rail extending in the fore-and-aft direction of the vehicle. The seat belt upper end section is moved in the vehicle fore-and-aft direction upon being driven by a motor operated in accordance with opening and closing states of a vehicle door. Accordingly, even in case the ignition switch 2 is turned OFF, a door switch SW detects the opening state of the door when the door is opened, so that the seat belt upper end section is moved forward thereby facilitating the passenger to be seated on a vehicle seat. Even in case the ignition switch 2 has been still in the OFF state, the door switch SW detects the closing state of the door when the door is closed, so that the seat belt upper end section is moved rearward thereby automatically restraining the passenger. The reference numeral 4 denotes another on-board electronic control device which is adapted to be supplied with voltage VB from the battery BT' since the ignition switch 12 is turned ON.

Thus, with the above-discussed voltage regulating device 1, the voltage directly input from the battery without passing through the ignition switch is regulated to the voltage at the predetermined level to be supplied to the on-board electronic control device, thereby putting the electronic control device in stand-by condition in which the electronic control device is always operable regardless of the ON or OFF state of the ignition switch. Accordingly, a small amount of so-called stand-by current unavoidably flows out from the vehicular voltage regulating device to the electronic control device. Such continuous flowing-out of the stand-by current provides the possibility of overdischarging of the battery in case OFF state of the ignition switch is continued for a long time, i.e., when no charging to the battery is continued for a long time under a condition an engine of the vehicle is not operated.

Figure 2:
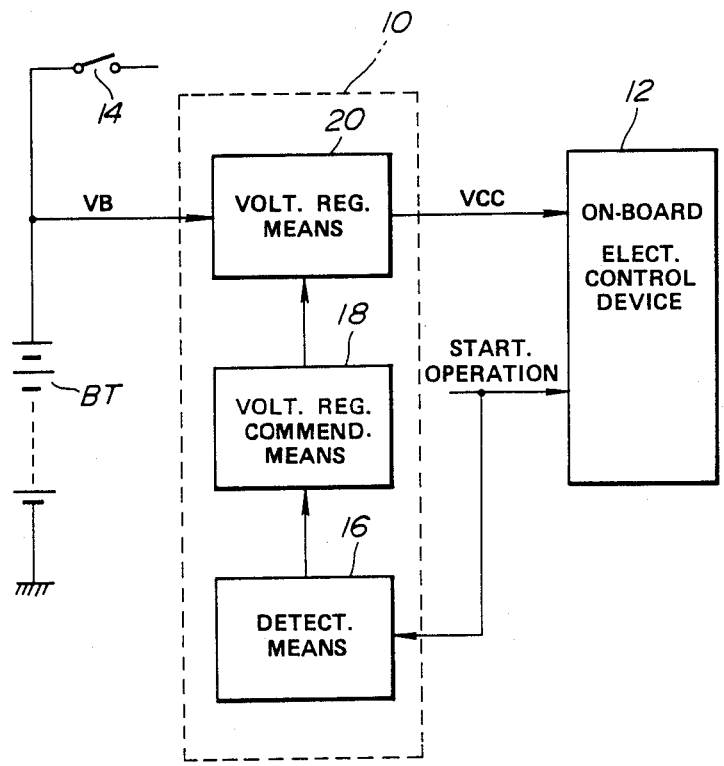
FIG. 2 is a block schematic diagram showing the principle of a vehicular voltage regulating system according to the present invention.

In view of the above description of the conventional vehicular voltage regulating system, reference is now made to FIGS. 2 wherein the principle of a vehicular voltage regulating system 10 according to the present invention is schematically illustrated. In this case, the voltage regulating system 10 is mounted on an automotive vehicle equipped with a on-board electronic control device 12 which is required to operate even if an ignition switch 14 is in OFF state or being turned OFF. The electronic control device 12 is electrically connected through the vehicular voltage regulating system 10 to a on-board battery BT, so that voltage from the battery is supplied to the electronic control system without passing through the ignition switch 14. In this case, the electronic control device 12 is an electronic control circuit constituting part of a passive seat belt system (not shown) having a seat belt for restraining a vehicle passenger in the vehicle. The seat belt has a lower end section engaged with a retractor secured to the floor of the vehicle, and an upper end section movably engaged with a roof rail extending in the fore-and-aft direction of the vehicle. The seat belt upper end section is driven and movable in the vehicle fore-and-aft direction by a motor operated in response to the opening and closing states of a vehicle door. Accordingly, even in case the ignition switch 14 is in OFF state, when the opening state of the vehicle door is detected, the seat belt upper end section is moved forward to put the seat belt into its passenger releasing position in which the passenger is released from restraint or facilitated to be seated on a vehicle seat. Even in case the ignition switch 14 is ON state or turned ON, when the closing state of the door is detected, the seat belt upper end section is moved rearward to put the seat belt into its passenger restraining position in which the passenger seated on the vehicle seat is automatically restrained. Another electronic control device (not shown) is electrically connected to the ignition switch 14 so as to operate only when the ignition switch 14 is in closing state or being turned ON.

The voltage regulating system 10 comprises detecting means 16 for detecting starting operation for the electronic control device 12 and outputting a detecting signal. The detecting means 16 is electrically connected to voltage regulation commanding means 18 for outputting a voltage regulation command signal for a predetermined time from a time at which the detecting means 16 outputs the detecting signal. The voltage regulation commanding means 18 is electrically connected to voltage regulating means for regulating which is directly electrically connected to the on-board battery BT (not through an ignition switch 14). The voltage regulating means 20 is adapted to regulate a voltage VB from the battery BT to a voltage VCC at a predetermined level and supply the regulated voltage VCC to the electronic control device when the voltage regulation commanding means 18 outputs the voltage regulation command signal.

Operation of the above voltage regulating system 10 will be discussed on the assumption that the ignition switch 14 is in the OFF state. When the detecting means 16 detects the fact that operation of the electronic control device 12 (which is required to operate even upon OFF state of the ignition switch 14) is started, the voltage regulating commanding means 18 makes voltage regulation command for the predetermined time from the time the detecting means detects the above-mentioned fact. During a time the voltage regulation command is made, the voltage regulating means 20 regulates the voltage VB (directly input from the battery BT) to the voltage VCC and supply the regulated voltage to the electronic control device 12. Then, when the predetermined time has been lapsed, the voltage regulation commanding means 18 stops making the voltage regulation command, so that the voltage regulating means 20 stops its operation to regulate the voltage VB to the voltage VCC and supply it to the electronic control device 12, thereby interrupting the flow of so-called stand-by current to the electronic control device 12.

Figure 3:
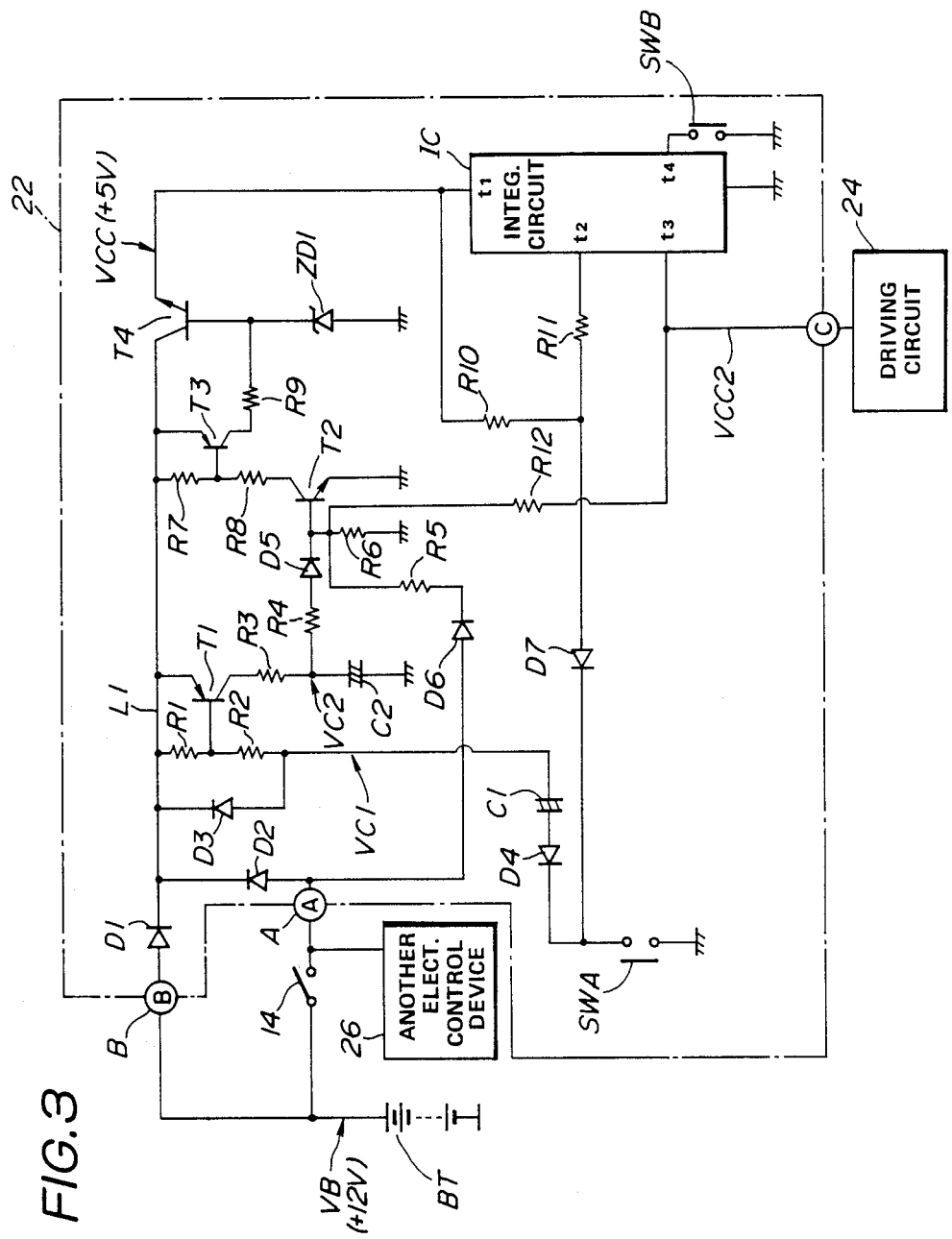
FIG. 3 is a circuit diagram of an embodiment of the vehicular voltage regulating system according to the present invention.

An embodiment of the vehicular voltage regulating system according to the present invention will be discussed hereinafter with reference to FIG. 3.

The vehicular voltage regulating system 10 comprises a voltage regulating circuit 22 which is adapted to supply a voltage VCC2 at "H" level to a driving circuit 24 which is a part of the electronic control device 12 of the passive seat belt system, which control device is required to operate even when the ignition switch 14 is in OFF state. The on-board battery BT supplies voltage VB (about +12 V) through terminal A to the voltage regulating circuit 22 when the ignition switch 14 is in ON state or being turned ON, while it supplies the voltage VB through a terminal B to the circuit 22 when the ignition switch 14 is OFF state or being turned OFF. Additionally, another electronic control device 26 is electrically connected to a line connecting the ignition switch 14 and the terminal A.

The voltage regulating circuit 22 includes a handle switch SWA for detecting the starting operation made for the electronic control device 12 of the passive seat belt system and outputting a detecting signal representative of the starting operation. This handle switch SWA corresponds to the detecting means 16 in FIG. 2 and adapted to be turned ON when a handle installed to the vehicle door is operated. In case the ignition switch 14 is in ON state, the voltage VB supplied from the battery BT to the terminal A is fed to the collector of a transistor T4 through a diode D2 and a power source line L1. The voltage VB is also fed to the base of a transistor T2 through a diode D6 and a resistor R5. The base of the transistor T2 is grounded through a resistor R6, so that a predetermined bias current flows through the transistor. When this transistor T2 is in ON state, a transistor T3 becomes into ON state under bias action of resistors R7, R8, so that the voltage VCC of a predetermined value (+5 V) is supplied from the transistor T4 to a terminal $t_1$ of an integrated circuit IC under the action of a resistor $9a$ and a zener diode ZD1. The resistor 9 and the zener diode ZD1 constitute the voltage regulating means 20 in FIG. 2. When this integrated circuit IC detects the fact that zero (0) V is developed at the terminal $t_2$, it operates such that the voltage VCC at the predetermined level impressed at the terminal $t_1$ is supplied through an internal circuit to the terminal $t_3$ at which the voltage VCC at "H" level is developed for a predetermined time from the time at which the terminal $t_2$ becomes at zero (0) V. The terminal $t_2$ is connected through a pull-up resistor R11 and a diode D7 to the handle switch SWA. The reference numeral R10 also denotes a pull-up resistor, so that the voltage VCC at the predetermined level is divided under the action of the resistors R10, R11 to be supplied and therefore the terminal $t_2$ is maintained at the predetermined level voltage. Bias current is fed from the terminal $t_3$ of the integrated circuit IC through a resistor R12 to the base of the transistor T2 thereby to maintain the transistor T2 in ON state, so that the integrated circuit IC is self-maintaining output of the voltage predetermined time.

Resistors R1, R2, a capacitor C1 and a diode D4 are connected between the handle switch SWA and the power source line L1. A transistor T1 has a base connected to a connecting point between the resistors R1, R2, and a collector which is grounded through a resistor R3 and a capacitor C2. The voltage at the connecting point between the resistor R3 and the capacitor C2 is defined at "VC2". The VC2 at the connecting point is supplied through a diode D5 to the base of the transistor T2, in which base current at a predetermined level is supplied to the transistor T2 under the action of the resistor R6. The capacitors C1, C2 constitute the voltage regulation commanding means 18 in FIG. 2.

In case the ignition switch 14 is in OFF state, the voltage VB supplied from the battery BT to the terminal B is similarly fed through the diode D1 and the power source line L1 to the collector of the transistor T4.

The manner of operation of the thus arranged voltage regulating circuit 22 will be discussed.

In case the ignition switch 14 is in ON state, the voltage VB from the battery BT is being supplied through the terminal B and the diode D2 to the power source line L1. The voltage VB from the battery BT is also being supplied through the terminal A to the transistor T2, in which the transistor T2 is turned ON under the action of the diode D6 and the resistors R5, R6. This turns the transistor T3 ON, so that the voltage VB (+12 V) is regulated to the voltage VCC at the predetermined level (+5 V) and impressed to the terminal $t_1$ of the integrated circuit IC, and then pulled up to the voltage at the predetermined level at the terminal $t_2$ under the action of the resistors R10, R11.

Discussion of operation of the voltage regulating circuit 22 will be continued with reference to FIGS. 4A to 4I assuming when the vehicle door is opened upon putting the ignition switch 14 in OFF state or under a condition the ignition switch 14 has been put into the OFF state in order that the passenger gets off the vehicle, after the above operation.

When the door handle is operated to open the vehicle door at a time t1, the handle switch SWA becomes into the opening state or is become into the opening state or is turned ON as shown in FIG. 4A. Since the voltage VB is impressed to the capacitor C1 from the power source line L1 through the resistors R1, R2, the voltage VC1 reaches zero (0) V for a moment simultaneously with turning ON of the handle switch SWA and thereafter is gradually raised to the level of the voltage VB under charging as shown in FIG. 4B. The transistor T1 is turned ON till a time t3 at which the voltage VC1 is raised to about 12 V as shown in FIG. 4C. When the transistor T1 is turned ON, the voltage VC2 is rapidly raised to about +12 V under charging and lowered at the time t3 at which the transistor T1 is turned OFF by initiating discharging as shown in FIG. 4D. At a time t2 the transistor T2 is turned ON as shown in FIG. 4E, and therefore the transistors T3 and T4 are continuously turned ON as shown in FIGS. 4F and 4G. Consequently, the transistor T4 regulates the voltage VB into the voltage VCC at the predetermined level (+5 V) as shown in FIG. 4H and impresses the regulated voltage VCC to the terminal $t_1$ of the integrated circuit IC.

Then, the integrated circuit IC detects the ON state of the handle switch SWA in response to lowering of the voltage to zero (0) V at the terminal $t_1$, and outputs the drive signal VCC2 from the output port or terminal $t_3$ to the driving circuit 234 in response to the signal representative of opening state of the vehicle door from the door switch SWB as shown in FIG. 4I. Such output of VCC2 is stopped when operation of a seat belt driving device including the driving circuit is completed. Further, the integrated circuit IC comes into self-maintaining state upon supplying base current to the transistor T2 from the terminal T3 through the resistor T2 (See FIGS. 4E and 4I). Then, the voltage VCC2 is lowered upon discharging as shown in FIG. 3D. When the voltage VCC2 is supplied through the terminal C to the driving circuit 24, the driving circuit 24 carries out a releasing operation control of the seat belt in which the seat belt upper end section is driven and moved forward so as to put the seat belt into the passenger releasing position. When such operation of the seat belt is completed, the integrated circuit IC stops output of the voltage VCC2 and releases the self-maintaining. As a result, the transistors T2, T3, T4 are continuously put into OFF state and therefore the voltage VCC has not output. In this condition, although the voltage VB is supplied through the diode D1 to the power source line L1, the stand-by current for the voltage regulating circuit 22 becomes zero under the action of OFF state of the transistors T2, T3, T4, reverse flow prevention of the diode D2 and OFF state of the handle switch SWA.

While only the handle switch SWA has been shown and described as the detecting means for detecting starting operation for an electronic control device, it will be understood that the handle switch SWA may be replaced with the door switch SWB (in FIG. 3) for detecting opening and closing states of the vehicle door, or a switch adapted to be closed when the vehicle door is opened and operation of the handle of the door. Although the on-board electronic control device has been shown and described as forming part of the passive seat belt system, it will be appreciated that the on-board electronic control device may form part of other systems such as a power-operated window system, for example, arranged such that a window panel or glass can be closed when it is found that a driver has forgotten to close the window panel after an ignition switch is OFF state or turned OFF.

What is claimed is:

1. A vehicular voltage regulating system for a vehicle having an ignition switch and an on-board electronic control device required to operate even when the ignition switch is in an OFF state, said vehicular voltage regulating system comprising:

means for supplying a first voltage directly from an on-board battery of the vehicle during the OFF state of the ignition switch;

means for detecting a starting operation for the on-board electronic control device during the OFF state of the ignition switch and outputting a first signal;

means for commanding voltage regulation by outputting a second signal for a predetermined time from a time at which said detecting means outputs said first signal; and means for regulating the first voltage fed from said first voltage supplying means into a second voltage at a predetermined level and supplying the second voltage to the on-board electronic control device in response to the second signal from said voltage regulation commanding means.

2. A vehicular voltage regulating system as claimed in claim 1, wherein the electronic control device includes a driving circuit for driving a seat belt.

3. A vehicular voltage regulating system as claimed in claim 2, wherein said detecting means includes a handle switch which is adapted to be turned ON when a vehicle door is operated.

4. A vehicular voltage regulating system as claimed in claim 3, wherein said voltage regulation commanding means includes a first capacitor connected between a line connected to the battery and said handle switch, and a second capacitor connected to said line and grounded.

5. A vehicular voltage regulating system as claimed in claim 4, wherein said voltage regulating commanding means includes a first transistor having an emitter connected to said line, a base connected to said first capacitor, and a collector connected to said second capacitor.

6. A vehicular voltage regulating system as claimed in claim 4, wherein said regulating means includes a second transistor having a collector connected to said line, and a zener diode connected to base of said transistor.

7. A vehicular voltage regulating system as claimed in claim 6, wherein said regulating means includes an integrated circuit having a first terminal connected to emitter of said second transistor, a second terminal connected to said handle switch, and a third terminal connected to said driving circuit.

8. A vehicle voltage regulating system for a vehicle having an ignition switch and an on-board electronic control device required to operate even when the ignition switch is in an OFF state, said vehicle voltage regulating system comprising:

means for supplying a first voltage directly from an on-board battery of the vehicle during the OFF state of the ignition switch;

means for detecting a starting operation for the on-board electronic control device during the OFF state of the ignition switch and outputting a first signal, said detecting means including a switch which is adapted to be turned ON upon the starting operation for the on-board electronic control device;

means for commanding voltage regulation by outputting a second signal for a predetermined time from a time at which said detecting means outputs said first signal, said voltage regulation commanding means including at least one capacitor connected to said switch and a line connected to the battery and said first voltage regulating means; and means for regulating the first voltage fed from said first voltage supplying means into a second voltage at a predetermined level and supplying the second voltage to the on-board electronic control device in response to the second signal from said voltage regulation command means.

* * * * *